United States Patent [19]

Potes, Jr. et al.

[11] Patent Number: 5,228,659

[45] Date of Patent: Jul. 20, 1993

[54] VEHICLE SEAT ASSEMBLY WITH EXTENDING SEAT TRACK TRIM COVER

[75] Inventors: Duane E. Potes, Jr., Adrian; Robert J. Henkel, White Lake, both of Mich.

[73] Assignee: Hoover Universal, Inc., Plymouth, Mich.

[21] Appl. No.: 927,344

[22] Filed: Aug. 10, 1992

[51] Int. Cl.$^5$ ............................................. F16M 13/00
[52] U.S. Cl. ..................................... 248/429; 297/346
[58] Field of Search ............... 248/429, 430; 296/65.1; 297/317, 346, 473, 468, 344, 452

[56] References Cited

U.S. PATENT DOCUMENTS

| 4,582,361 | 4/1986 | Kennel | 294/452 X |
| 4,601,517 | 7/1986 | Heesch | 297/452 X |
| 4,722,573 | 2/1988 | Komohara | 297/468 |
| 5,039,166 | 8/1991 | Kojho | 297/344 X |
| 5,087,009 | 2/1992 | Borlinghaus | 248/429 |

FOREIGN PATENT DOCUMENTS 26139 2/1987 Japan ................................. 248/429

Primary Examiner—J. Franklin Foss
Attorney, Agent, or Firm—Harness, Dickey & Pierce

[57] ABSTRACT

A vehicle seat assembly including an extensible seat track trim cover for covering the front or rear end portions of the lower seat track when the seat assembly is either in a forward or rearward adjusted position in which the front or rear end portions would be exposed to thereby improve the appearance of the seat within the interior of a motor vehicle, to prevent the accumulation of dirt and debris within the track structure and to prevent contact of a seat assembly occupant's clothing with the lubricant of the track structure.

16 Claims, 4 Drawing Sheets

5,228,659

VEHICLE SEAT ASSEMBLY WITH EXTENDING SEAT TRACK TRIM COVER

BACKGROUND AND SUMMARY OF THE INVENTION

The present invention relates to a vehicle seat assembly and in particular to a vehicle seat assembly having an extending seat track trim cover for covering the end portion of the lower seat track when the seat assembly is adjusted to a full forward or full rearward seating position.

Vehicle seat assemblies are typically equipped with fore and aft seat adjustment capability. The adjustment capability is usually provided by mounting the seat assembly on a track structure including a pair of lower tracks fixed to the motor vehicle with a pair of upper tracks slidable fore and aft thereon. The seat cushion and seat back are carried by the upper tracks for movement fore and aft within the motor vehicle to adjust the seat assembly position as desired by the seat occupant. When the seat assembly is in a rearwardmost position or close thereto, the front end of the upper track is rearward of the front end of the lower track and, depending upon the lengths of the tracks, the lower track can extend forward from the seat cushion and be exposed within the vehicle. Likewise, when the seat assembly is moved toward its forwardmost position, the rear end of the upper track is forward of the rear end of a lower seat track such that a portion of the lower seat track is exposed rearward of the seat assembly.

The exposed lower track is undesirable for both aesthetic and functional reasons. In a fully trimmed vehicle interior, the exposed metal seat track can detract from the overall appearance of the vehicle interior. Furthermore, for proper operation, the track structure is provided with grease for lubrication which can come into contact with the occupant's clothing when the seat track is exposed. In addition, with the lower track exposed, it is possible for dirt and other debris to collect in the track structure, causing poor performance during seat adjustment.

It is also becoming desirable to provide increased amounts of travel for the seat assemblies. To do so requires a lengthening of the lower track which results in a greater length of exposed track.

Accordingly, it is an object of the present invention to overcome the disadvantages described above with respect to the exposed lower seat track in a vehicle seat assembly.

It is a feature of the present invention to provide a trim cover for the lower seat track when the vehicle seat assembly is in a forward or a rearward adjusted position. It is a further feature of the present invention to provide a cover that is extensible from the movable portion of the seat assembly as it is moved to either a forwardmost or rearwardmost adjusted position to cover the otherwise exposed lower seat track.

Further objects, features and advantages of the invention will become apparent from a consideration of the following description and the appended claims when taken in connection with the accompanying drawings.

DETAILED DESCRIPTION OF THE INVENTION

Figure 1:
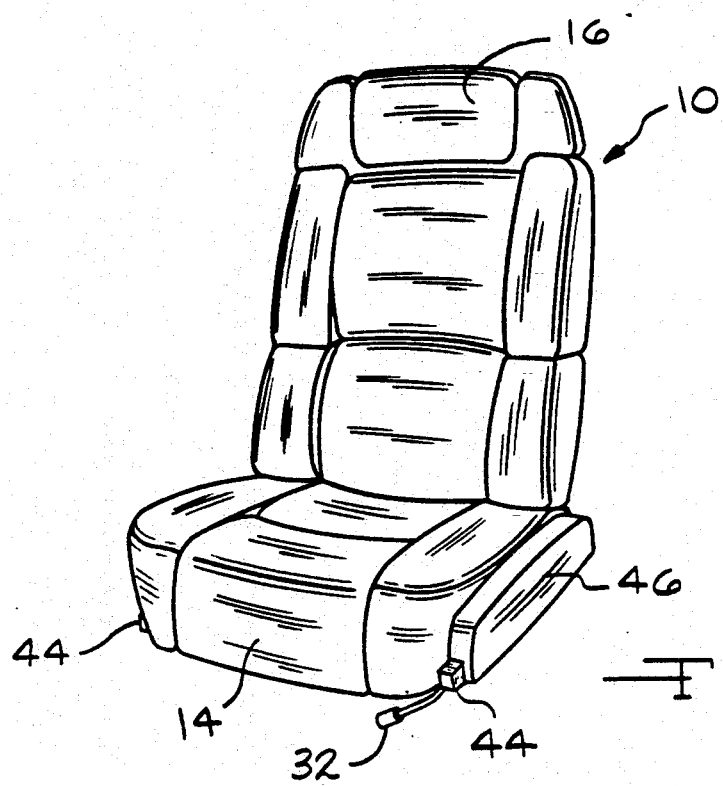
FIG. 1 is a perspective view of a vehicle seat assembly of the present invention showing the seat track trim cover in a retracted position.

The vehicle seat assembly of the present invention including an extensible seat track trim cover is shown in FIG. 1 and designated generally at 10. Seat assembly 10 is of a typical structure for a vehicle seat assembly and includes a lower seat cushion 14 and a seat back 16 extending generally upwardly from the rear of the seat cushion 14. Seat assembly 10 is mounted to a motor vehicle through a track structure 12 that provides adjustment of the seat position fore and aft within the vehicle. The track structure 12 includes on each side of the seat assembly, a lower track 18 mounted to the vehicle floor structure and an upper track 20 slidably carried on the lower track for fore and aft movement relative to the lower track 18. The upper track 20 includes two main components, a slide rail 22 and a riser 24. The slide rail 22 is mounted to the lower track 18 for sliding movement in a well known manner. The seat cushion 14 and seat back 16 are mounted to the riser 24. A bracket 25 is attached to the rear end of the riser to reinforce the riser at the attachment of the seat back and seat belt anchor if the seat assembly is equipped with seat belts.

The lower track 18 is adapted for attachment to a vehicle floor pan 23 through a plurality of mounting bolts 26 or other similar fasteners. A latch mechanism 28 carried by the upper track is used to lock the upper track in position relative to the lower track in the adjusted position. A release bar 30, having a handle 32 at the front end of the seat cushion 14, is provided for selectively releasing the latch mechanism 28 to enable adjustment of the seat assembly. The two lower tracks form a fixed part of the seat assembly while the upper tracks, seat cushion, seat back, etc. form the movable part of the seat assembly.

Figure 6:
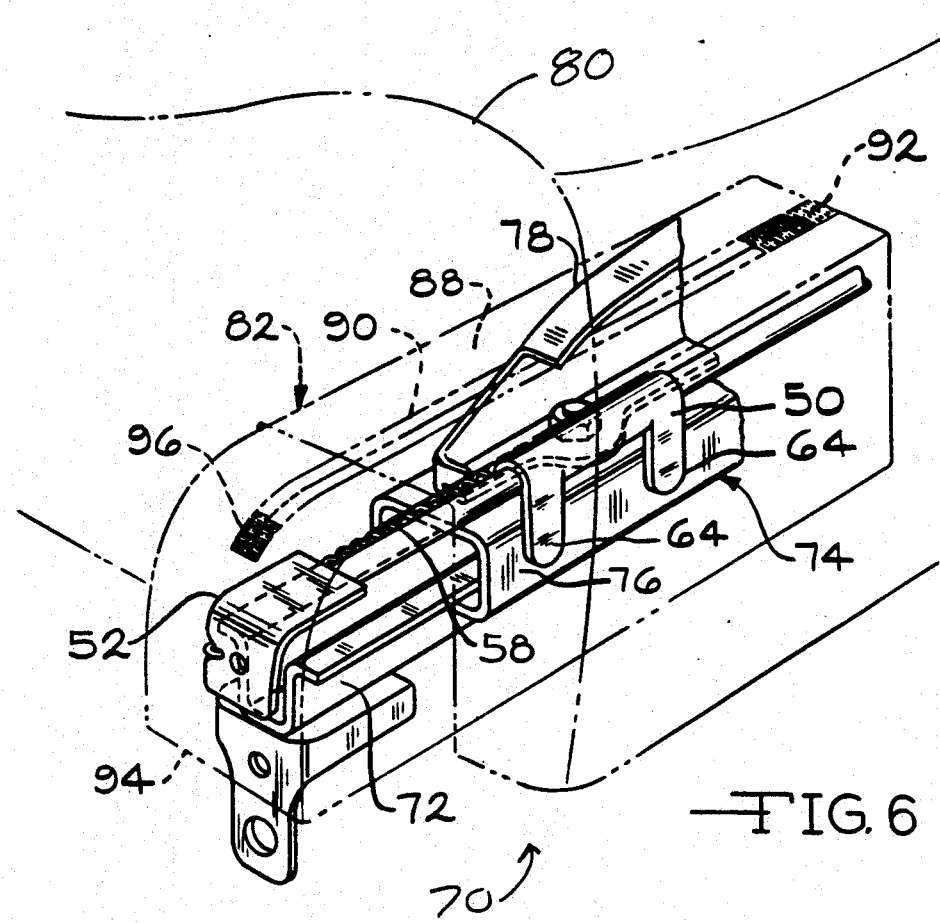
FIG. 6 is a perspective view of an alternative embodiment of a vehicle seat assembly utilizing a modified embodiment of the trim cover.
Figure 7:
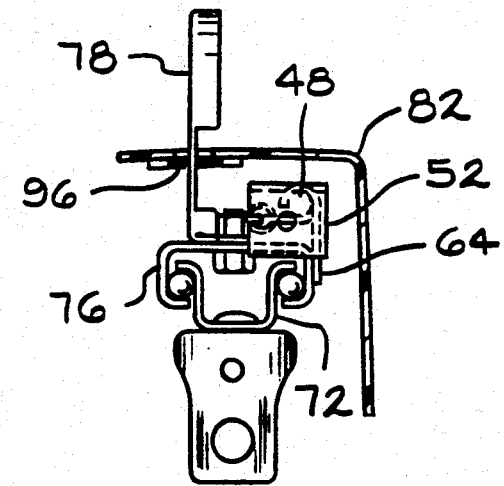
FIG. 7 is a front elevational view of the seat track showing the trim cover in section.

In the seat assembly 10 shown in FIG. 1, the track structure 12 is disposed generally to the side of the seat cushion 14. An alternative embodiment of the seat assembly is shown in FIG. 6 in which the track structure is positioned below the seat cushion.

Figure 2:
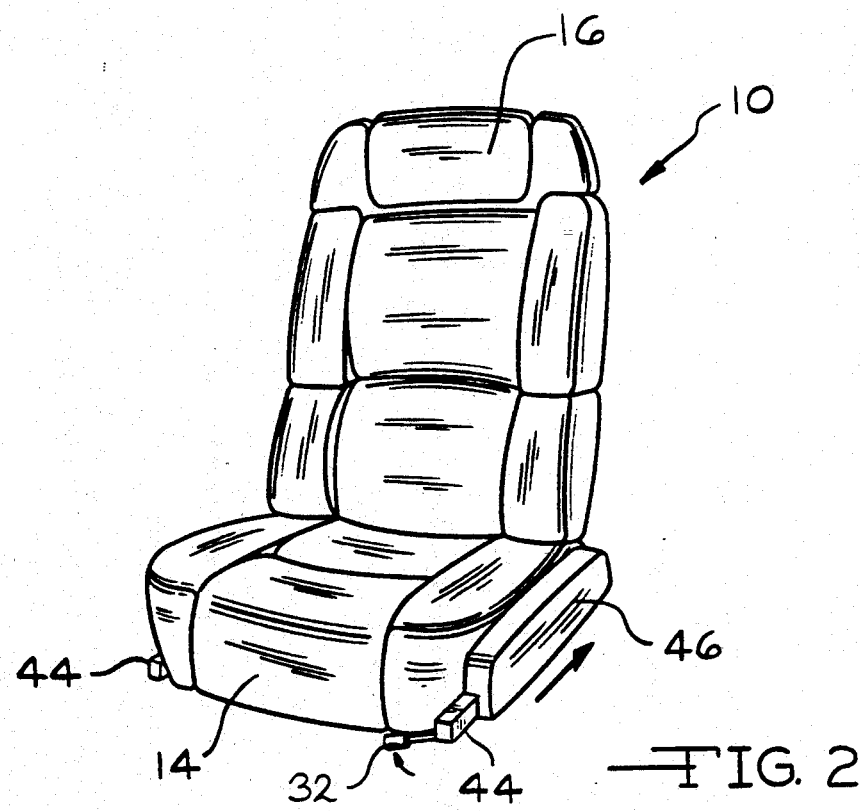
FIG. 2 is a fragmentary view of the seat assembly of FIG. 1 showing the trim cover in an extended position.

The track structure 12 shown in FIG. 2 is in a normally adjusted position which is neither the forwardmost nor rearwardmost position of the seat assembly relative to the lower track. When moved to its rearwardmost position, the front end 36 of the upper track 20 will be positioned rearwardly of the front end 38 of the lower track. Likewise, when the seat assembly is adjusted to its forwardmost position, the rear end 40 of the upper track will be positioned forwardly of the rear end 42 of the lower track 18.

Depending upon the style of the seat assembly 10, an end portion of the lower track 18 can be exposed beyond the seat cushion at either the front or rear of the seat assembly when the seat assembly is adjusted either fully rearward or fully forward. This exposed metal lower track can present an unsightly appearance in an otherwise well trimmed vehicle interior. Furthermore, due to the necessary grease used to lubricate the track structure, clothing of vehicle occupants which comes into contact with the track structure can become soiled.

To provide a finished appearance and to protect clothing from the lubricant, the seat assembly of the present invention includes a cover mechanism 43 having a shield or cover member 44 for covering the exposed lower track 18. The cover mechanism 43 is carried by the movable part of the seat assembly at the front of the seat assembly as described below. The shield 44 is extended from the movable part of the seat assembly as needed when the seat assembly is moved to a rearwardly adjusted position. In FIG. 1, shield 44 is in a retracted position drawn within a housing 46 covering the track structure 12 at the side of the seat cushion. When the seat assembly is moved to a rearward position, the shield 44 will contact the front end 38 of the lower track and be extended from the housing 46 to the position shown in FIG. 2. The shield 44 covers the top, front and outboard side of the lower track 18. If desired, the shield could be configured to cover the inner side of the track as well. To do so would likely require the addition of a slotted opening in the shield to provide clearance with components attached to the tracks such as the slot 90 shown in FIG. 6. A shield 44 can be provided on both sides of the seat assembly if desired to cover the front ends of both lower tracks.

Figure 5:
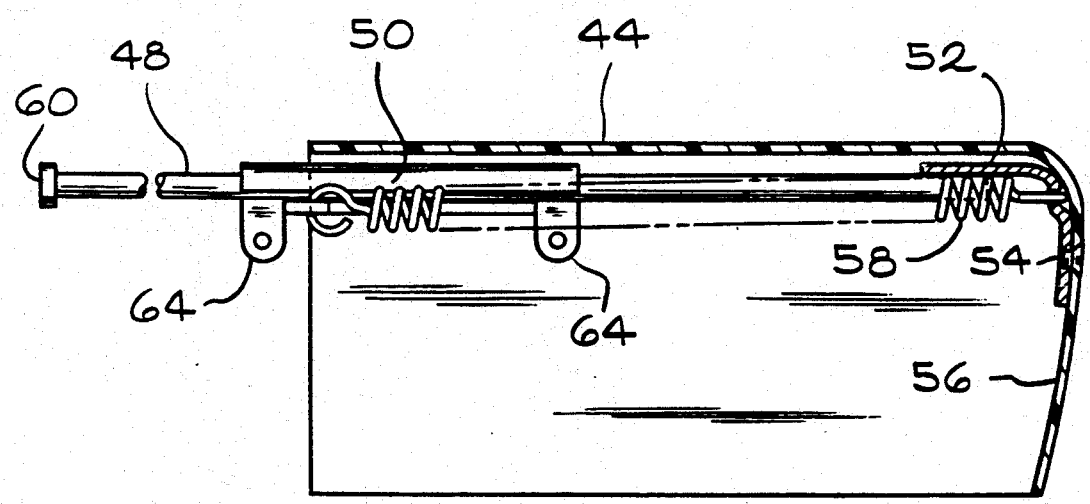
FIG. 5 is a side elevational view of the seat track trim cover separate from the seat assembly.

The shield 44 and its mounting structure is shown in greater detail in FIG. 5. Shield 44 can be made of stamped metal, molded plastic or any other suitable material capable of holding its shape. The shield can be painted, pigmented, coated, etc. to match the interior upholstery of the vehicle. The shield 44 is mounted to the upper track by a mounting bracket 50. Bracket 50 forms two bores 51 axially aligned with one another through which a rod 48 slides. At one end, the rod 48 is welded to a hook 52 and a screw 54 is used to attach the front wall 56 of the shield 44 to the hook 52. A tension spring 58 is connected at one end to the hook 52 and at the other end to the mounting bracket 50 so as to bias the shield 44 toward a retracted position within the housing 46. An enlarged head 60 at the end of the rod 48 opposite from the hook 52 serves as a stop to prevent withdrawal of the rod from the bracket 50. The bracket 50 is attached to the riser 24 of the upper track by rivets 62, or the like, extending through apertures in the mounting bosses 64 of the bracket. As can be seen from FIG. 3, as the upper track is moved rearward relative to the lower track, the front end 56 of the shield 44 will contact the front end 38 of the lower track. After initial contact, as the upper track continues to move rearward, the shield 44 is extended from the housing 46.

Figure 3:
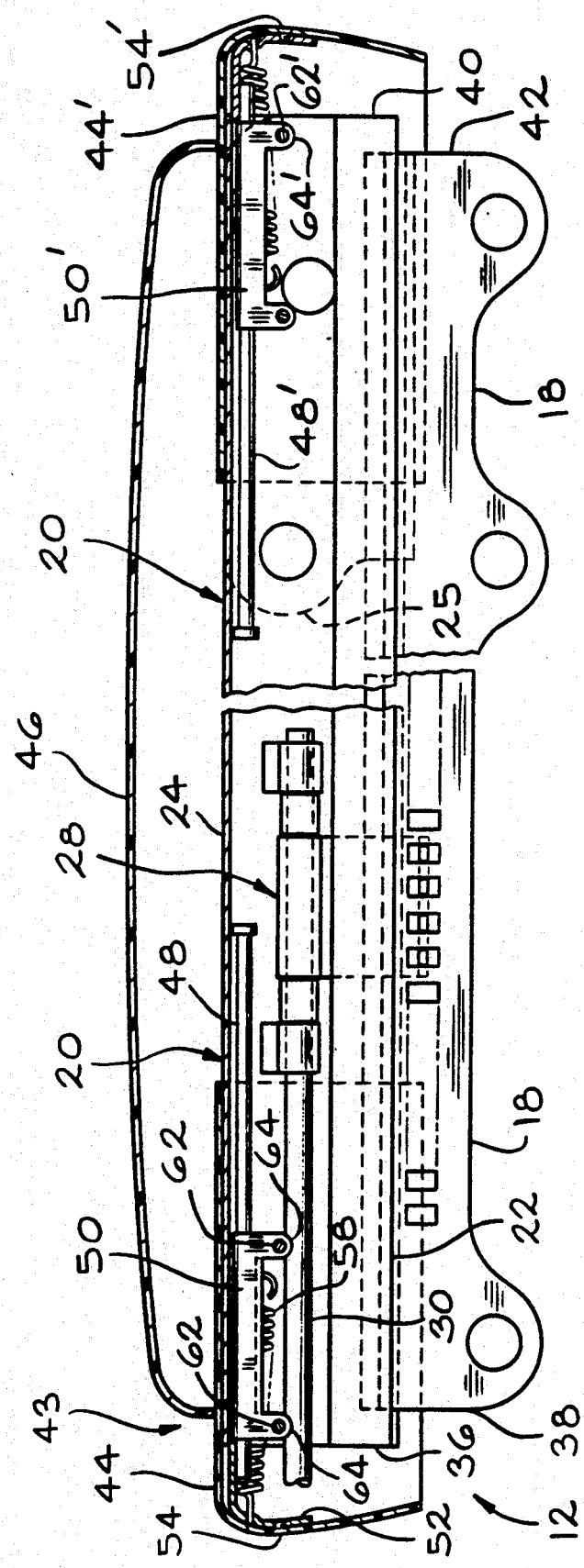
FIG. 3 is a side elevational view of the track structure illustrating the attachment of the trim cover.
Figure 4:
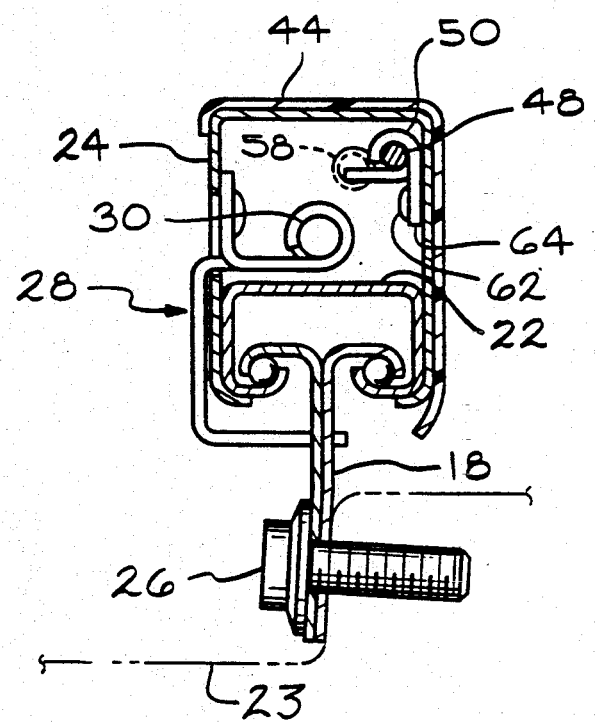
FIG. 4 is a front view of the track structure shown in FIG. 3.

If desired, the rear end of the track structure 12 can also be equipped with a trim cover for the lower track as shown in FIG. 3. The elements of the cover mechanism shown at the rear are given the same reference numerals as the cover mechanism at the front end with the addition of a prime symbol (') following the reference numeral. As the upper track is moved to a forwardmost position, the wall 56' of the shield 44' contacts the rear end 42 of the lower track thereby withdrawing the shield 44' from the housing 46 as the seat assembly is continued forward.

While the invention has been shown and described with respect to a manually adjusted seat assembly, it is to be understood that the extending seat track trim cover of the invention can be incorporated into a power adjustable seat assembly as well. Furthermore, the trim cover of the present invention can also be incorporated into a seat assembly having a track structure which is positioned below the seat cushion as shown with the seat assembly 70 of FIG. 6. Seat assembly 70 includes a track structure having a lower track 72, an upper track 74 comprised of a slide rail 76 and riser 78 extending upwardly from the top of the slide rail 76. The frame components of the seat cushion 80 and seat back (not shown) are attached to and extend from the upper track 74. The shield 82 is mounted to the upper track by a rod 48 and mounting bracket 50 in a similar manner as shown in FIG. 3 with respect to shield 44.

To enable the shield 82 to cover the top of the lower track 72 and also to avoid interference with the riser 78, the top portion 88 of the shield 82 is formed with an elongated slot 90 extending from the rear end 92 of the shield forward toward the front end 94. As the seat assembly is moved forward and the shield is retracted into the seat cushion, the riser 78 extends through the slot 90. A flexible brush 96 or the like is positioned within the slot 90 to fill or cover the slot 90 when the shield is extended from the set cushion to cover the lower track, preventing contact of the occupant's clothing with the track structure lubricant and to keep dirt from the track structure.

The seat track trim cover of the present invention provides for improved appearance of a vehicle seat assembly when the seat is adjusted to either a forward or rearward position. Covering of the otherwise exposed lower seat track avoids the unsightly appearance of the metal track structure. In addition, by covering the exposed track, the possibility for dirt to collect within the track structure and for the occupant's clothing to become soiled is reduced. The provision of a track trim cover enables the lower track to be made longer than otherwise desired with an uncovered track, enabling the seat to be designed with increased travel.

It is to be understood that the invention is not limited to the exact construction illustrated and described above, but that various changes and modifications may be made without departing from the spirit and scope of the invention as defined in the following claims.

We claim:

1. A seat assembly for a motor vehicle having a fixed part attached to said vehicle and a movable part movably carried by said fixed part for adjusting the position of said seat assembly in said vehicle, said seat assembly comprising:

a lower track member adapted to be fixed to said vehicle, said lower track member forming said fixed part;

an upper track member mounted to said lower track member for fore and aft movement relative to said lower track member;

a seat cushion and a seat back attached to said upper track member, said upper track member, said seat cushion and said seat back forming said movable part;

said lower and upper track members each having front and rear ends and front and rear end portions adjacent said front and rear ends respectively, said upper track member being movable to positions in which either said front or rear end portions of said lower track member extends beyond said movable part; and a shield extensible from said movable part to cover one of said end portions as said movable part is moved to a position in which said one end portion extends beyond said movable part, said shield having a top wall above said lower track member and a sidewall to one side of said lower track member to cover the top and said one side of said lower track member.

2. The seat assembly of claim 1 wherein said shield engages one end of said lower track member during movement of said movable part in one direction as said one end portion extends beyond said movable part, said shield being extended from said movable part as said movable part continues to move in said one direction.

3. The seat assembly of claim 2 further comprising means for retracting said shield into said movable part as said movable part moves in a direction opposite said one direction to a position in which said one end portion of said lower track member no longer extends beyond said movable part.

4. The seat assembly of claim 3 further comprising guide means for guiding the movement of said shield as said shield is extended from and retracted into said movable part.

5. The seat assembly of claim 3 wherein said retracting means includes a tension spring connected to and between said shield and said movable part.

6. The seat assembly of claim 1 wherein said top wall includes a slot extending in the direction of movement of said shield relative to said movable part to provide clearance between said shield and said movable part during extension and retraction of said shield.

7. The seat assembly of claim 6 wherein said slot is filled with a flexible body to close said slot when said shield is extended from said movable part.

8. The seat assembly of claim 7 wherein said flexible body includes a pair of brushes extending across said slot from opposite sides of said slot.

9. The seat assembly of claim 1 further comprising a slide rod slidably mounted to said movable part in the direction of travel of said movable part relative to said fixed part, said rod having a first end attached to said shield to extensibly mount said shield to said movable part.

10. The seat assembly of claim 9 further comprising a mounting bracket fixed to said movable part having a pair of spaced axially aligned bores through which said slide rod extends and slides.

11. The seat assembly of claim 10 wherein said slide rod has a second end enlarged to form a head larger than said bores.

12. The seat assembly of claim 9 further comprising a tension spring extending between and connected to said slide rod first end and said mounting bracket.

13. A seat assembly for a motor vehicle having a fixed part attached to said vehicle and a movable part movably carried by said fixed part for adjusting the position of said seat assembly in said vehicle, said seat assembly comprising:

a lower track member adapted to be fixed to said vehicle, said lower track member forming said fixed part;

an upper track member mounted to said lower track member for fore and aft movement relative to said lower track member;

a seat cushion and a seat back attached to said upper track member, said upper track member, said seat cushion and said seat back forming said movable part;

said lower and upper track members each having front and rear ends and front and rear end portions adjacent said front and rear ends respectively, said upper track member being movable to positions in which either said front or rear end portions of said lower track member extends beyond said movable part; and a cover member for covering one of said end portions of said lower track member, said cover member including a top wall overlaying said lower track member, said top wall including a slot extending in the direction of movement of said upper track member to provide a clearance between said cover member and said upper track member.

14. The seat assembly of claim 13 wherein said cover member is mounted to said upper track member for movement relative to said upper track member in the direction of movement of said upper track member relative to said lower track member, said cover member including an end wall engagable with one of said lower track member ends as said upper track member is moved to a position in which an end portion of said lower track member adjacent said one end extends beyond said upper track member whereby engagement of said cover member with said one end of said lower track member prevents continued movement of said cover member as said upper track member continues to move.

15. The seat assembly of claim 13 further comprising a flexible member extending across said slot in said cover member to fill said slot in the absence of said upper track member.

16. The seat assembly of claim 15 wherein said flexible member is a brush.

* * * * *